E. J. VON HENKE.
WELD TESTING DEVICE FOR CHAINS.
APPLICATION FILED AUG. 8, 1918.

1,339,610. Patented May 11, 1920.

Inventor
Edmund Janusz Von Henke
By his Attorneys
Townsend & Decker

UNITED STATES PATENT OFFICE.

EDMUND JANUSZ von HENKE, OF MILWAUKEE, WISCONSIN, ASSIGNOR TO THOMSON ELECTRIC WELDING COMPANY, OF LYNN, MASSACHUSETTS, A CORPORATION OF MASSACHUSETTS.

WELD-TESTING DEVICE FOR CHAINS.

1,339,610.　　　　Specification of Letters Patent.　　Patented May 11, 1920.

Application filed August 8, 1918. Serial No. 248,862.

*To all whom it may concern:*

Be it known that I, EDMUND JANUSZ VON HENKE, a citizen of the United States, and a resident of Milwaukee, in the county of Milwaukee and State of Wisconsin, have invented certain new and useful Improvements in Weld-Testing Devices for Chains, of which the following is a specification.

My invention relates to means for testing welded chain links for imperfection of the welded joints.

The object of my invention is to provide a means whereby two magnetic circuits may be established through the two joints of the link at once and a varying magnetic flux produced through each joint simultaneously with the other may be used to generate electric currents, said currents being substantially equal if the magnetic reluctance of the two joints is substantially equal, thereby indicating a substantially perfect welded link. Should an unequal reluctance exist, currents generated by the respective fluxes will be unequal thereby indicating an inequality of welds and a probable imperfection in one of the two welds of the link. Suitable indicating instruments may be employed as hereinafter described for showing the relations of the magnetic reluctance in the two joints respectively.

My invention relates more particularly to apparatus for establishing the magnetic fluxes simultaneously through the two welds of each link and comprises essentially an electromagnet having two pairs of legs or poles projecting therefrom in the same direction and adapted to be applied to a welded link to establish simultaneously two magnetic paths through the two welded joints respectively, said electromagnet being conveniently mounted upon a carriage shiftable in a direction parallel to a table adapted to support a length of chain, whereby the magnet may be moved conveniently into position over successive links and may be depressed into contact with them in succession to enable the test to be made.

Figure 1:
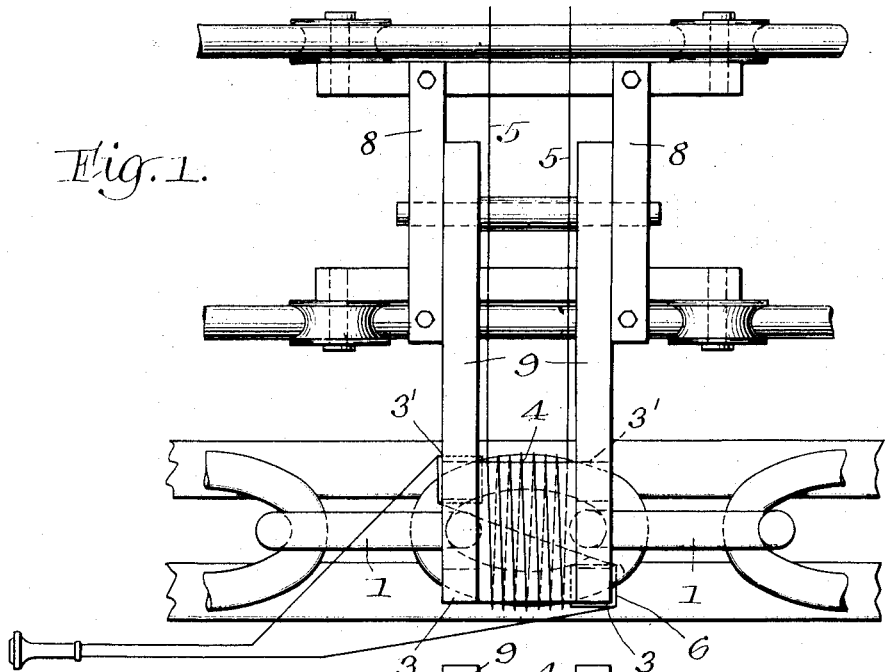

In the accompanying drawings, Figure 1 is a plan of an apparatus suitable for practising my invention.

Figure 2:
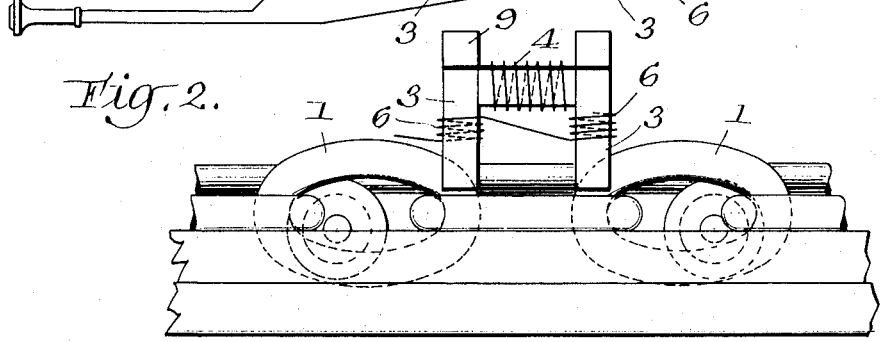
Figure 3:
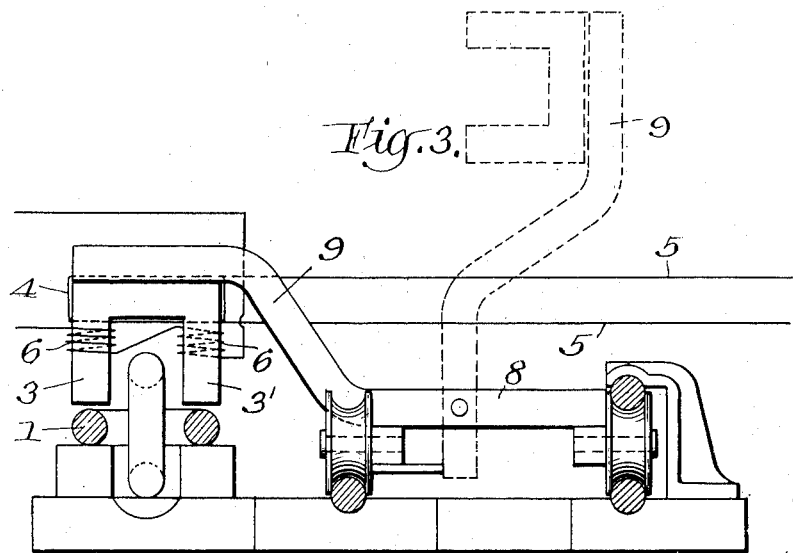

Fig. 2 is a side elevation of the same and Fig. 3 is an end elevation.

In the drawings showing the device applied to the testing of the links 1 of the chain, the projecting poles or legs of the electromagnet from which the two magnetic fluxes are simultaneously derived are indicated by the numerals 3, 3, 3', 3' while 4 indicates an exciting coil supplied with alternating current from wires or connections 5, 5 to produce varying or changing magnetic flux which, on the application of the device to a link, is established through two magnetic circuits one of which includes the poles 3, 3, one side of the link and the welded joint in such side, while the other magnetic circuit includes poles or legs 3', 3' and the welded joint in the other side of the link.

6, 6 indicates generating coils interlinked with the two magnetic flux paths respectively and forming the seat of the indicating currents which, for the purposes of observation, may be connected in opposition through an audible indicator 7 such for instance as a telephone receiver.

Upon applying the two sets of poles of the magnet to the two sides of the link a duplex magnetic circuit is established, one circuit through each joint of the link to be tested and so that the flux in each path will be necessarily dependent upon the reluctance of the section of metal being tested. In case the reluctance of the two paths in the portion thereof included between the two poles of each pair be equal, the same value of flux will be established through each path and the voltages produced in detector coils 6 will be equal, so that the resultant current produced in the telephone receiver or other indicating instrument will be *nil* or approximately *nil* indicating a perfectly or satisfactorily welded link. Should, however, there be a blow hole or other imperfection in one of the welds, the reluctance of the path including that weld will differ from that of the other, thus causing the fluxes through the two complete paths to differ. Hence the voltages produced by the varying fluxes in the detector coil 6 will be unequal and a current of an amount depending upon the inequality will flow through the telephone receiver or other indicating instrument, resulting in an audible or visible indication, indicating a difference of condition of the two joints respectively and a probable presence of an imperfect weld.

The electro-magnet by means of which the magnetic flux is produced through the tested section, may be mounted on the carriage 8 and supported therefrom by a pivoted arm 9, said carriage being mounted on rails laid parallel to a support upon which a section of the chain is disposed so as to permit the electromagnet to be moved parallel to the chain to bring the magnet over the links successively. The chain itself may be conveniently supported on a table cut away at the center as shown in the sectional view Fig. 3.

What I claim as my invention is:

1. An apparatus for testing welded chain links, consisting of an electromagnet having two pairs of legs or poles adapted to establish two magnetic fluxes through the two welded joints respectively in the two sides of the link, indicating coils magnetically interlinked with the magnetic paths thus established and means for indicating a difference in magnetic reluctance of the two simultaneously established magnetic circuits including said joints when said magnet is excited by an alternating or varying current.

2. In an apparatus for testing chain links, the combination of a support adapted to support a length of welded chain, a carriage mounted on rails parallel to said support and an electromagnet borne by said carriage and having two sets of poles adapted respectively to engage the two sides of a chain link and establish simultaneous magnetic fluxes through the two welded joints.

Signed at Milwaukee, in the county of Milwaukee and State of Wisconsin, this 22d day of July, A. D. 1918.

EDMUND JANUSZ von HENKE.

Witnesses:
J. J. STAMM,
J. F. GEADIS.